Patented Oct. 26, 1937

2,097,275

UNITED STATES PATENT OFFICE 2,097,275

GLASS COMPOSITION FOR ELECTRICAL DISCHARGE DEVICES

Hellmuth Fischer, Ilmenau, Germany

No Drawing. Application February 21, 1934, Serial No. 712,440. In Germany May 20, 1933

10 Claims. (Cl. 250—27.5).

My invention relates to improvements in glass compositions for electrical discharge devices, and the object of the improvements is an electrical discharge device having a wall of a glass which has high luminescence when it is subjected to the rays produced by the device.

Generally speaking I have found that numerous metals may be used for imparting luminescence to a glass exposed to the rays produced in electrical discharge devices or lamps, provided that care is taken that the amount of other substances in the glass which prevent luminescence is reduced below a certain maximum, or that if possible such substances are entirely avoided. Substances which are most conspicuous in this respect are iron salts, which generally tend to reduce luminescence imparted to the glass by other bodies. Thus, for example, I have found that the luminescence of uranium glass may be considerably increased if the amount of iron in the glass is reduced. Further, I have found that other substances which of themselves produce luminescence are effective to prevent the luminescence of other substances. Examples of such other substances are lead salts. Thus, by reducing the amount of the said detrimental substances, for example iron salts, in the glass, or by melting a glass free from lead compounds, I am enabled to produce a great number of sorts of glass which have more or less luminescence, and which are adapted to transform invisible rays such as corpuscular-rays or wave-rays (cathode-rays, ultra-violet rays, X-rays, etc.) into visible rays of different colours. The luminescence spectrum of these glasses is continuous, and it comprises either some or all of the colours of the spectrum from violet to red.

If such glasses are used for making electrical discharge receptacles—such for example as lighting tubes, cathode glow lamps, lamps in which an incandescent filament emits ultra-violet rays and electrons, Crookes' tubes, Braun's cathode ray oscillographs, X-ray tubes—the following results are obtained:

1. By transformation of the invisible ultra-violet rays into visible light rays the amount of light emitted from the tube or lamp is increased, and also the energy of the electrons which impinge upon the glass wall with certain gas pressures may be transformed into visible light.

2. If in a lighting tube the colour of the luminescence of the glass is different from the colour of the radiation of the gas, the colour of the radiation of the lighting tube or glow lamp may be modified in a desired manner by additive mixture of the radiations of the gas and the luminescence.

3. Ordinarily the radiation of the rare gases or metal vapours used in lighting tubes or lamps comprises only some wave lengths. Therefore, by the continuous spectrum of the luminescence of the glass wall the intervening spaces of the spectrum are filled out, so that the tube emits light which has a continuous spectrum, similar to that of an incandescent solid body, and the objects illuminated by the tube or lamp appear in their natural colours.

4. The cathode rays which are produced in many electrical discharge tubes are made visible by impinging upon the luminescent glass. Therefore, a layer of luminescent substances within such tubes may be dispensed with. Further, X-rays impinging upon the luminescent glass wall or on a screen made from such glass are made visible.

From the general description it will be understood that my invention is based on an entirely new principle, permitting the production of luminous glasses which have high luminescence when they are used as the wall or a part of the wall of an electrical discharge device, or when they form such other parts of receptacles or lamps as are exposed to the different rays produced within the said receptacles. The luminescence of most of the glasses of my invention is produced only if they are used as parts of or in connection with electrical discharge devices. If the luminescence of the glass is tested in the usual way, by exposing the same to the filtered ultra-violet rays of a quartz-mercury lamp, no luminescence or very weak luminescence is observed. Therefore, it is a surprising result that the glasses have high and even very high luminescence when they are used in connection with electrical discharge devices. Typical examples of such glasses are those which contain compounds of tin, thorium, arsenic or niobium. Probably the reason why heretofore such glasses have never been used in the manufacture of electrical discharge devices having luminescent glass walls is that when exposed to dark ultra-violet rays some of them have only weak luminescence of a colour other than the normal colour of the luminescence produced by the electrical discharge device. For example, in filtered ultra-violet light, glasses containing lead have a very weak pink luminescence, while as a part of an electrical discharge device their luminescence is of an intense blue. On the other hand it should be remarked, that some glasses have a good luminescence in the dark ultra-violet light, while their luminescence in connection with an electrical discharge device is very weak. Examples of such glasses are those which contain cerium.

The glasses which are used according to my invention as the wall or part of the wall of electrical discharge devices or lamps are manufactured according to a general principle. By the application of this principle in the manufacture of luminescent glass I am enabled to intensify the luminescence of glasses which are known to be luminescent, and which for this reason have been used as the walls of electrical discharge devices or lamps, such for example as the glasses containing uranium or lead. Further, luminescent glasses may be manufactured with certain contents of metal compounds which heretofore were not known to impart luminescence to glass, or which imparted to glass only weak and practically worthless luminescence.

In carrying out the invention the glass from which the wall of the receptacle is made should contain the metal producing luminescence in any suitable combination and within the proper limits of concentration, and, further, the content of the aforesaid detrimental matter (such as iron) in the glass must be below a certain maximum, which maximum is different according to the active metal contained in the glass and producing the luminescence. Further, according to my invention, the glass forming the wall or a part of the wall of an electrical discharge device may contain two or more metals imparting luminescence thereto. And, if it contains two or more, the iron content may be as great as is permissible in a glass in which that luminescence-imparting metal alone is found that permits of the greatest iron content. I have found that in glasses which are known to be luminescent, and which contain equal amounts of metals imparting luminescence, the intensity of the luminescence is so much the higher, the smaller the iron content in the glass. If the iron content of such a glass is reduced to a small fraction of the content of iron ordinarily found in the glass, the intensity of the luminescence is frequently increased to a multiple of the original value. As far as I am aware, this increase in the luminescence of the glass walls in electrical discharge devices by reduction of the iron content in such glass was not known, and the result could not be expected from the present knowledge of the art.

Further, I have found that numerous other metal compounds, being introduced into and forming components of the glass, fail to impart luminescence thereto, exclusively for the reason that luminescence is prevented by the presence of iron. Iron is usual in glass from which electrical discharge devices are made, the said iron being contained in the raw material from which the glass tubing for apparatus and so on is made (the glass tubing being further shaped when softened under a blast flame). In the manufacture of such glass the relation between iron content and luminescence has therefore always been left out of consideration. In glasses that have a "half-white" colour (that is to say, glasses that, in comparison with optical glass or crystal glass, are dull), the iron content is ordinarily not much less than 0.1% $Fe_2O_3$. If, however, glass containing any of such metal compounds is melted with a lower iron content, and if electrical discharge devices are made therefrom, luminescence will be found to begin, as the iron content is reduced, at first in a small degree, and thereafter in a rising degree. Some of the said glasses have a slight to medium luminescence in an electrical discharge device, even with an iron content of about 0.1% $Fe_2O_3$. Finally, the luminescence of the glasses of this invention exceeds that of glasses heretofore used for the purpose, such as uranium glass and lead glass as heretofore compounded. In glasses containing different metals the amount of the iron content below which slight luminescence begins is different, and, further, the increase of luminescence caused by further reduction of the iron content of the glass is different. Therefore, when the intensity of the luminescence is plotted in a diagram as a function of the iron content of the glass, the sorts of glass will have different characteristic curves.

A glass containing lead and having an iron content of 0.05% $Fe_2O_3$ has a weak blue luminescence when it is used in a lighting tube filled with a mixture of rare gases and mercury vapour. The increase in the light intensity of this tube by luminescence of the glass wall is not much more than 10%, as compared to a tube of the same inner diameter and the same thickness of the wall, which is made from glass which is not luminescent. If, however, the wall of the tube is made from a glass of the same lead content, in which the iron content is only 0.012% $Fe_2O_3$, the intensity of the light of the tube is increased, by the blue luminescence of the glass wall, almost by 130%. The spectrum of the luminescence of the glass extends continuously from violet to red, its highest intensity being in the blue part of the spectrum. This result was found by measurement of the total radiation of the tube by means of a photo-cell which has a curve of sensitiveness corresponding to that of the human eye. If the $Fe_2O_3$ content of the glass is reduced to 0.008%, the increase of the light intensity of the tube is more than 140%. As far as I am aware, glass containing lead and having a content of $Fe_2O_3$ less than 0.04% has heretofore not been used in the manufacture of electrical discharge devices, and therefore I claim an electrical discharge device which contains or is made from a glass containing lead, and in which the iron content is less than 0.03% $Fe_2O_3$, is within the field of my invention.

If a discharge device of the same character is made from uranium glass which is free from lead and which contains 2.2% $U_3O_8$ and 0.095% $Fe_2O_3$, the increase of the light intensity as compared to a device of equal dimensions and made from a colourless glass which is not luminescent is about 14%. Notwithstanding the comparatively intense luminescence of the uranium glass, this value is because the glass itself (which has a yellowish colour) absorbs a part of the violet and blue rays emitted from the gas. If a glass is used in which the $Fe_2O_3$ content of the glass is about 0.012%, while the $U_3O_8$ content is the same as before, the light intensity is increased not by 14%, but by about 105%. Heretofore uranium glass for electrical discharge devices has not been manufactured with a lower iron content than lead-containing glass used in such discharge devices—that is, with a $Fe_2O_3$ content less than 0.04%. An electrical discharge device comprising glass containing uranium and having an iron content of less than 0.025% $Fe_2O_3$ is within the field of my invention.

If electrical discharge devices of similar type are made from glass containing vanadium, conditions prevail, with reference to the luminescence of the glass with varying iron contents, which are similar to those described above. The colour of the luminescence of such glasses is brownish-yellow. As far as I am aware, glass containing vanadium has heretofore not been used in the manufacture of electrical discharge devices. The luminescence of the wall of such discharge devices (which is visible also with higher iron contents), is considerably intensified if the iron content of the glass wall is less than 0.15%. Therefore an electrical discharge device made from or including glass containing vanadium and having an iron content less than 0.15% $Fe_2O_3$ is within the field of my invention.

Glass of this character, in which the $Fe_2O_3$ content is reduced as stated above, may be manufactured by using substantially the same raw materials as heretofore in the manufacture of the glass, in which, however, the content of $Fe_2O_3$ is as low as possible, and always lower than the critical values I have indicated.

It is not necessary that the active metal compounds in the wall of the glass of the discharge receptacle be present in a definite concentration, but the concentration may be held within greater or smaller limits according to varying conditions. But only if the amount of metal is equal to or more than a certain minimum, does the luminescence of the glass attain values which are practically important. It should be understood that when the active metal is present in small concentration, the iron content also of the glass should be as small as possible. The smaller the said iron content, the smaller is the amount of active metal which is needed for producing a sufficiently intense luminescence of the glass wall. In glasses containing lead, uranium or samarium the said lower limits are about 0.001% Pb, 0.0005% U and 0.0001% Sm, it being understood that the $Fe_2O_3$ content of the glass is not more than about 0.005%. I wish it to be understood that these figures are only approximate.

The upper limit to the content of active metal in the glass wall depends on various factors. In glasses which contain for example uranium, copper, nickel, cobalt or vanadium, the upper limit of the amount of such metals in the glass wall is determined by the absorption of the glass wall which should not be too high. If the concentration of the said metals is too high, a considerable proportion of the radiation of the luminescence (and in lighting tubes and cathode glow lamps also a considerable part of the gas radiation) is lost. However, a sharp upper limit to the content of active metal can not be given for each glass. Further, the maximum of the addition of active metal in the glass may be determined by the fact that a part of the said active metal might be precipitated in the glass in elemental form. For example, in a glass which contains gold as an active metal, say in the form of gold chloride. If the content of gold exceeds a certain maximum, a part of the gold will be precipitated in elemental form, it will impart purple color to the glass, and it will absorb a high proportion of the luminescence or the radiation emitted from the inner part of the tube. If the glass wall of the discharge receptacle contains lead, the upper limit for the lead content of the glass wall is determined by the possibility of working the glass under the blast flame, which working is made more difficult as the lead content is increased. It is further determined by the yellow colour of the glass which increases with the lead content, and which absorbs a part of the light passing through the wall. And, it is finally determined by the reduction of the luminescence of the glass wall which takes place when the lead content is very high. According to the character and the shape of the discharge receptacle the walls of which are made from the said glass, one or the other of the aforesaid factors prevails in determining the upper limit to the lead content, and therefore the said limit varies according to different conditions. Similar considerations prevail in such discharge receptacles in which the luminescence of the walls is caused by silver, arsenic or antimony. In discharge receptacles the walls of which contain tin or tungsten added to the batch in the form of tin dioxide or tungsten trioxide, the upper limit to the content in the glass of such metals is also determined by the possibility of excessive opacification which might impair the permeability of the glass.

The colour of the luminescence of the glass wall may be changed by varying the composition of the body of glass, for example by using larger or smaller amounts of boric acid or phosphoric acid in lieu of silicic acid.

If the necessity of increasing the intensity of the light of a discharge receptacle by the luminescence of the glass wall is less important than the desire to save expensive active metal compounds, the same luminescence as in a glass of high iron content may be obtained with a considerably lower amount of the active metal compound, by reducing the iron content of the glass. If luminescence is produced by compounds of certain expensive rare earths or uranium, the cost may thus be considerably reduced, the said reduction of the cost of the raw materials being not by any means lost by the slightly increased cost of the raw materials that are poor in iron. Thus, for example, a reddish luminescence may be imparted to the glass wall of a discharge receptacle if with a content of 0.007% $Fe_2O_3$ the glass contains only 0.005% of samarium oxide. With an iron content in the glass amounting to 0.35% $Fe_2O_3$ only weak luminescence is produced even if the $Sm_2O_3$ content is increased to several per cent. A glass which contains erbium oxide, and which is used as the wall of a discharge receptacle, has a reddish-yellow luminescence, and the necessary amount of erbium in the glass is very small, if the content in $Fe_2O_3$ is about 0.01%. If the iron content is higher, the content in erbium must be increased accordingly, in order to produce luminescence of the same intensity. From a definite iron content in the glass upwardly, an increase of the content in active metal compound has no result as far as luminescence is concerned. Ordinarily this upper limit to the iron content is the same as the iron content of such glasses as have heretofore been used in the manufacture of electrical discharge devices. For some active metals the upper limit to the iron content is higher. In case of a glass containing erbium the said upper limit is about 0.3% $Fe_2O_3$, and for samarium it is 0.35% $Fe_2O_3$, as has been stated above. As far as I am aware, glasses containing samarium and erbium have heretofore not been used in the manufacture of electrical discharge devices with luminescence in view.

If the compound of the active metal causes absorption of the visible rays, and if the amount of the said metal compound in the glass is made comparatively small, as is possible without reduction of the luminescence by reduction of the iron content, a further advantage is obtained, in that the amount of light absorbed by the glass is reduced; and, accordingly, in lighting tubes the luminous efficiency is increased. Examples are lighting tubes the glass walls of which contain uranium or copper. A lighting tube filled with a mixture of rare gas and mercury vapour and having a glass wall containing 0.6% $U_3O_8$ and 0.014% $Fe_2O_3$ has substantially the same light intensity as a tube of the same dimensions the glass wall of which contains 2% $U_3O_8$ and 0.1% $Fe_2O_3$. This is explained by the increase in the intensity of the luminescence of the glass by the reduction of the iron content, whereby the reduction of the uranium content is partly compensated, and further, it is explained by the reduced absorption of the glass which is poor in uranium. The reduction of the cost caused by the reduction of the uranium content in the glass wall is obvious. This is practically a most important embodiment of my invention.

If the glass wall of electrical discharge tubes contains compounds of praseodymium and neodymium, it has a violet to reddish luminescence. The limit for the iron content below which the luminescence of the glass wall is considerably intensified is about 0.03%.

As has been mentioned above, it was not known that quite a number of metals may be used for making glasses of intense luminescence when employed in the manner described, provided that the iron content in the glass does not exceed a certain value. These metals may be contained in the glass in any suitable combination, for example, in the form of an oxide, a silicate, a borate, a phosphate, a sulfide, a selenide, a halide etc., provided that they are not precipitated in elemental form. The figures hereinafter referred to of the iron contents of the glass of electrical discharge devices are to be understood to be the limits above which luminescence is practically lost. If the iron content is less than the said limits, luminescence which at first is but weak or hardly visible begins to gain in intensity. Under these circumstances luminescence has heretofore not been observed, and therefore such glasses have never been used in electrical discharge devices with this property in view. In order to obtain the highest possible luminescence it is always advisable to avoid iron contents in the glass wall higher than 0.05% to 0.06% $Fe_2O_3$. But these figures are only approximate, because general rules cannot be given for all the metals by reason of their different properties.

Of course, luminescence of the said glass takes place not only in the walls made from the said glasses, but also in other parts of electrical discharge devices which are made from the said glass, and which are impinged upon by the rays. Therefore my claims include the use of the glass in such other parts of the discharge device or lamp.

In the following I shall describe a series of glasses which have been tested by me as to their luminescence by giving the percentages of the active metals and the maximum of the iron content therein, and I wish it to be understood that all the glasses tested by me had a composition similar to the one referred to hereafter and containing quartz, boric acid, soda and potash, though my invention is not limited to this composition of the glass. For example, I may also use glasses which contain lithia as an alkaline component.

A glass containing copper which has been added to the batch for example in the form of copper oxide has whitish-yellow luminescence under the aforesaid conditions if the iron content is less than 0.35% $Fe_2O_3$. A content of copper oxide of 0.08% has been found to give good results.

A glass containing silver which has been added to the batch for example in the form of silver nitrate has whitish-yellow luminescence, if the iron content is less than 0.25% $Fe_2O_3$. A content of silver of 0.13% has been found to give good results.

A glass containing gold which has been added to the batch for example in the form of gold chloride has whitish luminescence, if the iron content is less than 0.3% $Fe_2O_3$. A content of gold of 0.014% has been found to give good results.

A glass containing cadmium which may have been added to the batch for example in the form of cadmium oxide, sulfide or selenide has reddish-yellow or orange luminescence, if the iron content is less than 0.025% $Fe_2O_3$. A content of cadmium sulphide of 0.3% has been found to give good results.

A glass containing barium which may have been added to the batch for example in the form of barium carbonate or nitrate has reddish luminescence, if the iron content is less than 0.03% $Fe_2O_3$. A content of barium oxide of 0.85% has been found to give good results.

A glass containing yttrium which has been added to the batch for example in the form yttrium carbonate has reddish-white luminescence, if the iron content is less than 0.25% $Fe_2O_3$. A content of yttrium oxide of 0.13% has been found to give good results.

A glass containing lanthanum which has been added to the batch for example in the form of lanthanum carbonate has reddish luminescence, if the iron content is less than 0.2% $Fe_2O_3$. A content of lanthanum oxide of 0.45% has been found to give good results.

A glass containing thallium which has been added to the batch for example in the form of thallium carbonate or oxide has blue luminescence, if the iron content is less than 0.25% $Fe_2O_3$. A content of thallium oxide of 0.18% has been found to give good results.

A glass containing zirconium which has been added to the batch for example in the form of the hydrated oxide has yellowish luminescence, if the iron content is less than 0.15% $Fe_2O_3$. A content of zirconium oxide of 0.85% has been found to give good results.

A glass containing tin which has been added to the batch for example in the form of tin dioxide or stannous oxide has reddish-yellow luminescence if the iron content is less than 0.5% $Fe_2O_3$. A content of stannous oxide of 0.75% has been found to give good results.

A glass containing ytterbium which has been added to the batch for example in the form of ytterbium nitrate has orange-red luminescence, if the iron content is less than 0.1% $Fe_2O_3$. A content of ytterbium oxide of 0.35% has been found to give good results.

A glass containing thorium which has been added to the batch for example in the form of thorium carbonate has reddish-white luminescence, if the iron content is less than 0.2% $Fe_2O_3$. A content of thorium oxide of 0.35% has been found to give good results.

A glass containing arsenic which has been added to the batch for example in the form of arsenic trioxide has reddish-white luminescence, if the iron content is less than 0.25% $Fe_2O_3$. A content of arsenic trioxide of 0.85% has been found to give good results.

A glass containing antimony which has been added to the batch for example in the form of antimony trioxide has reddish-white luminescence; and if the metal has been added to the batch in the form of antimony trichloride it has white luminescence; if in both cases the iron content in the glass is less than 0.35% $Fe_2O_3$. A content of antimony trioxide of 1.1% has been found to give good results.

A glass containing bismuth which has been added to the batch for example in the form of oxide or the hydrated oxide of bismuth has purple luminescence, if the iron content is less than 0.2% $Fe_2O_3$. A content of bismuth oxide of 0.6% has been found to give good results.

A glass containing niobium which has been added to the batch for example in the form of niobium pentoxide has whitish-yellow luminescence, if the iron content is less than 0.6% $Fe_2O_3$. A content of niobium pentoxide of 0.65% has been found to give good results.

A glass containing tantalum which has been added to the batch for example in the form of tantalum pentoxide has yellowish-white luminescence, if the iron content is less than 0.7% $Fe_2O_3$. A content of tantalum pentoxide of 0.75% has been found to give good results.

A glass containing chromium which has been added to the batch for example in the form of chromic oxide has dark-blue luminescence, if the glass had been subjected to reducing melting and if the iron content is less than 0.025% $Fe_2O_3$. A content of CrO (chromous oxide) of 0.05% has been found to give good results.

A glass containing molybdenum which has been added to the batch for example in the form of sodium molybdate has red luminescence, if the iron content is less than 0.3% $Fe_2O_3$. A content of molybdenum trioxide of 0.65% has been found to give good results.

A glass containing tungsten which has been added to the batch for example in the form of tungsten trioxide or sodium tungstate has whitish luminescence, if the iron content is less than 0.2% $Fe_2O_3$. A content of tungsten trioxide of 0.7% has been found to give good results.

A glass containing cobalt which has been added to the batch for example in the form of cobalt oxide has a dull reddish-yellow luminescence, if the iron content is less than 0.025% $Fe_2O_3$. A content of cobalt oxide of 0.0087% has been found to give good results.

A glass containing nickel which has been added to the batch for example in the form of nickel carbonate or oxide has reddish luminescence, if the iron content is less than 0.25% $Fe_2O_3$. A content of the lower nickel oxide of 0.015% has been found to give good results.

I wish it to be understood that the above metals are only examples and that there are other metals in the periodic system which are adapted to impart luminescence to the glass if the iron content is sufficiently reduced, so that the number of such metals might be increased. However, I have found that the metals enumerated above produce a particularly high intensity. The spectrum of the luminescence of all of the said sorts of glass is continuous, and it extends in some cases from violet to red. The total light emitted for example from a high-voltage lighting tube filled with rare gas and mercury vapour and charged with a current of about 35 to 40 milliamperes is intensified in different degrees, if its wall is made from a glass which is poor in iron and contains one of the aforesaid metals in any suitable form of combination. When the glass wall of the said lighting tube contains 0.07% copper oxide, the increase of the total light emitted from the device is 35 per cent, and if the glass wall contains 0.015% of gold the increase of the light is 18%. If the glass wall contains 1.13% antimony oxide the increase is 50%. If the wall is made dull (as by sand-blasting) the increase is, in the case last specified, of antimony oxide 91%. With a content of 3% antimony oxide the volume of light is, in a smooth-surfaced tube, increased by 51%, and if the same glass is made dull at its outer surface the increase is 97%. If the glass wall contains 0.73% stannous oxide or stannous chloride the increase is 46%, and if the outer surface of the said glass wall is made dull the increase is 82%. If the glass wall contains 0.63% of anhydrous niobium acid the increase is 55%.

I have tested substantially all of the metals, with the end in view of determining the serviceability of their compounds as luminescence-affording substances under the circumstances here specified. There remained but a few—radium, for example—that, because of their great expense, were beyond my ability to test (and, for the same reason, beyond the range of practical importance). Of those that I have tested, iron alone is unsuitable; and this for the reason that its compounds, although responsive to excitation, so that they too emit radiation, emit rays that are infra-red, and accordingly invisible. All the other metals are serviceable. But, although the metals generally (and subject to the qualifications stated) are serviceable, they are not equally effective, nor are they, with practical considerations in view, equally desirable. Of all the metals, I have found the compounds of tin most effective and desirable. In the same group with tin (Group IV of the periodic series) are found the metals thorium, lead, samarium, erbium, praseodymium, neodymium, yttrium, lanthanum, and ytterbium. I have tested all of these; the compounds of all of them are serviceable; and among them the compounds of lead are particularly effective and desirable. Uranium, in Group VI, is, next to tin, most effective and desirable. In Group VI, along with uranium, are found chromium, molybdenum, and tungsten. All of these I have tried, and all with success; the compounds of tungsten, however, are particularly effective and desirable. Group I includes copper, silver, and gold. All of these I have tried with success; but the compounds of copper have proved to be particularly effective and desirable. In Group V are found vanadium, niobium, tantalum, arsenic, antimony, and bismuth. I have tested all of these, and all with success; but I have found that the compounds of vanadium, niobium, tantalum, and antimony to be peculiarly effective and desirable. It remains to say that in Group II barium and cadmium are found; in Group III, zirconium; and in Group VII, cobalt and nickel, all substances whose compounds are effective, in the manner described; but since in all cases luminescence is weak, none of these substances has, nor is any likely to have, practical value or importance.

As the art stands, the three important elements for my purpose are (in order of preference) tin, uranium, and lead; but the circumstances of the industry may change, so that within the field that I have explored, and without additional invention, other particular substances may become of equal or even of greater importance. For instance, some vapor other than that of mercury may in the progress of the art be employed as the conducting vapor within the tube; and in that event the compounds of other metals would in all likelihood be found preferable to those of the three metals here particularly named.

My invention, therefore, comes to this, that, employing a glass substantially free of iron, it is possible to employ as luminescence-affording material compounds of other metals in quantities smaller by far than had ever been realized, and with effects greater by far than had ever been attained.

The glasses which are used for making the glass walls of the aforesaid high voltage lighting tubes may be composed as follows:

75 kilogrammes of quartz sand containing not more than 0.01% of iron oxide ($Fe_2O_3$) =0.007 metallic iron 7 kilogrammes of boric acid, crystallized, refined and practically free of iron 18 kilogrammes of soda, calcined, practically free of iron 10.7 kilogrammes of 98% potash, calcined, practically free of iron.

To this batch the aforesaid metal compounds are added, for example 1.2 kilogrammes of stannous chloride, crystallized, purest quality, or 1.15 kilogrammes of antimony trioxide, purest quality, practically free of iron.

The said percentage of stannous chloride and antimony trioxide may also be the double or a multiple of the percentage given in the examples, and it may also be reduced to one tenth and less without completely removing the luminescence of the glass wall. But the figures given in the examples have given very good results, though I do not wish to be understood that glasses containing tin or antimony compounds in the aforesaid proportions have the highest possible luminescence, though I believe that they approximate the best results.

In the foregoing I have given figures for the percentages of active metal in the glass which have been found to give good results. But I wish it to be understood that I do not limit myself to the said figures, and that the expert will have no difficulty in finding other figures which are most suitable for the purpose aimed at in each case.

Care should be taken that the refractory material from which the glass-melting receptacles are made contains the smallest possible percentage of iron.

By tubes of the aforesaid type the walls of which contain stannous oxide or antimony oxide a beautiful reddish-white light is produced which is similar to day light, particularly if the outer surface of the tube is made dull. By the last-named expedient the luminescence of the glass wall is intensified, and the light is more uniformly dispersed. The objects illuminated by the tube appear in perfectly natural colors, so that such devices or lamps may advantageously be used for domestic illumination. All the colors are more true than in the light of incandescent lamps. In the aforesaid examples the iron content of the glass walls is about 0.015% $Fe_2O_3$. The fundamental composition of the glass walls consists exclusively of four substances: silicic acid, boric acid, soda and potash. This composition of the glass is important, because not only the colour but also the intensity of the luminescence largely depends on the fundamental composition of the glass. An addition of magnesium oxide (MgO) to the said fundamental composition reduces the volume of light emitted from the discharge receptacle by reduction of the luminescence of the glass wall, and the said luminescence is even further reduced by an addition of calcium oxide (CaO) or aluminium oxide ($Al_2O_3$) or by an addition of both of the said substances. The chemical resistance of the glass is, furthermore, considerably improved by the presence of stannous oxide or stannous chloride or antimony oxide. Further, a variation of the proportions of the components of the batch has a certain influence on the intensity of the luminescence of the glass wall. Some of the glass walls of discharge receptacles which contain one or the other of the aforesaid metals in any composition have an intense afterglow after the lamp has been switched out, for example glasses which contain copper oxide or stannous oxide or stannous chloride.

If it is desired to produce a particular color or a particular intensity of the luminescence of the glass wall of an electrical discharge device, two or more compounds of differently acting metals may be simultaneously present in the glass from which the wall is made. In this case the iron content of the glass, calculated as $Fe_2O_3$, should not be higher than the iron content allowed in a glass in which only that metal is contained for which the smallest iron content is permitted. Under this condition all the active metals are brought to the desired action substantially in an undiminished degree. In a lighting tube of the character described above the increase of the light emitted by luminescence of a glass wall containing 0.63% $SnO_2$, 0.53% $Sb_2O_3$ and 0.015% $Fe_2O_3$ is about 73%.

If, however, a particular colour tint of the luminescence is to be produced by two or more active metals, the luminescence produced by one or more of the said metals may be intentionally weakened by means of a comparatively high addition of iron, which may be higher than the iron content allowed in a glass containing only one of the metals, provided, however, that the iron content is below the limit which is allowed for the active metal permitting the highest iron content. Therefore the iron content of the glass wall of the receptacle may be increased to the highest limit which would be allowed for the glass, if the said glass contained only that active metal which permits the highest content of iron in the glass.

When active metals are combined care should be taken that the metals are selected so that the luminescence of the glass imparted by one metal is not impaired by another active metal. For example, an active metal may perfectly remove the activity of another metal, even if so much of the last-named metal is added to the glass as otherwise would be sufficient for producing intense luminescence. If the glass of the wall of an electrical discharge device contains 0.8% $Sn O_2$ and 0.06% Cu O, the colour and intensity of the luminescence is the same as that of the glass containing only copper oxide. If the said glass wall simultaneously contains 0.63% $Sn O_2$ and 0.17% Pb O it has in substance only the blue luminescence of a glass containing lead.

It may also happen that, though the luminescences of the active metals contained in the glass are all effective and contributory to the total luminescence, yet the intensity of the luminescence of the glass is smaller than the sum of the intensities of the individual luminescences. An example is a high voltage lighting tube of the type referred to above, the glass wall of which contains simultaneously 0.06% CuO, 1% $Sb_2O_3$ and 0.015% $Fe_2O_3$. The colour of the luminescence is a mixture of that of a glass wall containing only CuO and a glass wall containing only $Sb_2O_3$. The increase of the emitted light is only 37%, and if the outer surface of the glass wall has been made dull it is 83%, which is less than the increase produced by an equal amount of antimony oxide if added alone for the purpose in view.

It will be perceived that the invention proceeds from the discovery of a relationship between the substance introduced into the glass batch to afford luminescence and the quantity of other metallic compounds, primarily those of iron, present in the batch. The discovery is that for each substance so introduced to afford luminescence there is a limit—a critical maximum value—for the inevitably present iron. If that limit be exceeded, the luminescence will be small (or, perhaps, wholly lacking) and will not be susceptible to increase by increasing the quantity of luminescence-affording substance. If, however, the quantity of iron be reduced and kept within the limit, not only will the luminescence be many fold greater, but it will be variable, in response to the quantity of the substance employed to afford luminescence. And the further discovery is that for the several substances available to afford luminescence (some of them never so used before) there are specific correlative critical maximum values for the iron content of the glass; and that these values vary, as between the various luminescence-affording substances.

The discovery respecting iron becomes applicable in the case of a second metal (lead, for example) which, with respect to a third and luminescence-affording metallic compound, may have like inhibiting effect. By keeping both the iron component and the lead component of the batch below particular critical maximum limits, the luminescent effect of the substance chosen is notably enhanced, rendered practically valuable, and rendered variable in response to variation in the quantity of luminescence-affording substance used.

I claim:

1. An electrical discharge device having a wall of glass that includes in its composition a luminescence-affording compound of a metal selected from a group that consists of lead, uranium, vanadium, copper, tin, antimony, neobium, tantalum, and tungsten, the glass having a content of $Fe_2O_3$, such content not exceeding, respectively, in the cases of the compounds named, 0.03%, 0.025%, 0.15%, 0.35%, 0.5%, 0.35%, 0.6%, 0.7% and 0.2%.

2. An electrical discharge device having a wall of glass that includes in its composition a luminescence-affording compound of uranium and having an iron content not exceeding 0.025%.

3. An electrical discharge device having a wall of glass that includes in its composition a luminescence-affording compound of lead and having an iron content not exceeding 0.03%.

4. An electrical discharge device having a wall of glass compounded of silicic acid, boric acid, soda, and potash, having a content of ferrous oxide not exceeding 0.5%, and containing stannous oxide in an amount of substantially 0.75% as a minimum.

5. An electrical discharge tube for producing white light having a filling of noble gas and mercury vapour, in which there is an electric discharge of low pressure mercury vapour, the glass wall of which contains stannous oxide and an iron content not more than 0.5% $Fe_2O_3$.

6. An electrical discharge tube for producing white light having a filling of noble gas and mercury vapour, said glass wall containing stannous chloride and an iron content not more than 0.5% $Fe_2O_3$.

7. An electrical discharge device having a wall of glass containing, with the glass-forming ingredients, substantially, $SnO_2$, 0.63%; $Sb_2O_3$, 0.53%; $Fe_2O_3$, 0.015%.

8. An electrical discharge device having a wall of glass that includes in its composition a luminescence-affording tin compound and having an iron content not exceeding 0.5%.

9. An electrical discharge device as defined in claim 1, the wall of glass having a good light-diffusing surface.

10. An electrical discharge device as defined in claim 8, the wall of glass having a good light-diffusing surface.

HELLMUTH FISCHER.